United States Patent [19]
Gamberini

[11] Patent Number: 5,515,740
[45] Date of Patent: May 14, 1996

[54] APPARATUS FOR DOSING A PHARMACEUTICAL PRODUCT INTO CAPSULES

[75] Inventor: Ernesto Gamberini, Rostignano-Pianoro, Italy

[73] Assignee: MG2 S.p.A., Pianoro, Italy

[21] Appl. No.: 100,578

[22] Filed: Jul. 30, 1993

[30] Foreign Application Priority Data

Jul. 31, 1992 [IT] Italy .................................. BO92A0295

[51] Int. Cl.$^6$ .......................... G01N 35/00; G01N 33/15
[52] U.S. Cl. ...................................... 73/865.8; 73/863.91
[58] Field of Search .................... 73/865.8, 866, 73/863.91, 863.92; 198/468.4, 471.1

[56] References Cited

U.S. PATENT DOCUMENTS

| | | | |
|---|---|---|---|
| 3,881,356 | 5/1975 | Palm | 73/863.91 |
| 3,921,821 | 11/1975 | Champion et al. | 73/863.91 |
| 4,172,380 | 10/1979 | Ansaloni | 73/864.33 |
| 4,343,130 | 8/1982 | Facchini | 53/272 |
| 4,472,960 | 9/1984 | Motoyama et al. | 73/78 |
| 4,574,646 | 3/1986 | Mattei et al. | 73/863.92 |
| 4,640,376 | 2/1987 | Hinzpeter | 73/863.91 |
| 4,890,441 | 1/1990 | Meerkatz et al. | 53/456 |
| 5,274,327 | 12/1993 | Smith et al. | 324/226 |

FOREIGN PATENT DOCUMENTS

| | | |
|---|---|---|
| 0430897A1 | 5/1991 | European Pat. Off. |
| 2038272 | 7/1980 | United Kingdom |
| 2200883 | 8/1988 | United Kingdom ............... 198/471.1 |

Primary Examiner—Hezron E. Williams
Assistant Examiner—Daniel S. Larkin
Attorney, Agent, or Firm—Seed and Berry

[57] ABSTRACT

A machine for dosing a pharmaceutical product into capsules, in which a dosing unit doses a pre-determined quantity of the product into empty capsules by means of dosers and test apparatus operable to test the quantity of the product dosed by the dosers on a sample of the capsules; the testing apparatus including a first and a second weighing unit to weigh, respectively, a capsule before the dosing unit and after the dosing unit; the machine including monitoring means operable, for each capsule of the sample, to evaluate the difference between the weight detected, respectively, by the first and second weighing units to determine the quantity of dosed product.

18 Claims, 5 Drawing Sheets

APPARATUS FOR DOSING A PHARMACEUTICAL PRODUCT INTO CAPSULES

BACKGROUND OF THE INVENTION

The present invention relates to a method for metering or dosing a pharmaceutical product into capsules. The present invention also relates to a machine for performing the above method.

Metering or dosing of pharmaceutical products, generally as powders, into capsules is obtained using machines in which a metering unit fills the empty capsules with a pre-determined quantity of product. Thereafter a testing unit checks a sample of full capsules to determine statistically if the quantity of product within the capsules lies within an acceptable range. The measurement of the quantity of product metered into the capsules is generally an indirect type of measurement and is obtained by evaluating the difference between the weight of a full capsule, detected by the testing unit, and the average weight of capsules known from the type of capsules employed. This method involves the disadvantage of a somewhat imprecise determination of weight, in particular when the weight of the quantity of product to be metered into the capsules is of the same order of magnitude as the weight of the capsules themselves. In fact, the tolerances of the weight of product and of the capsule can compensate one another with the result that an evaluation of the weight of the product is obtained which is significantly less or greater than the real value.

In other types of machines, the uncertainty in the average weight of empty capsules is eliminated by using a method in which the testing unit weighs a full capsule and subsequently pierces each weighed capsule to evacuate the product from the capsule itself by suction. Finally, the emptied capsule is weighed and the difference between the weight of the capsule full and the weight of the capsule after having been emptied is evaluated. However, even this method involves the disadvantage of inexact weighing of the pharmaceutical product both because not all of the product is always emptied from the capsule and because the measured weight of the empty capsule is defective by the slivers of capsule removed upon piercing.

SUMMARY OF THE INVENTION

The object of the present invention is to provide a method of metering a pharmaceutical product into capsules.

According to the present invention there is provided a method of dosing a pharmaceutical product into capsules, comprising a dosing step in which a pre-determined quantity of said product is dosed into empty capsules by dosers, and a testing step in which the quantity of said product dosed into the said capsules during said step is checked, said testing step being performed on a sample of said capsules; characterised in that said testing step comprises, in turn, a first step in which capsules of said sample are weighed before filling by means of a first weighing unit; a second step in which the capsules of said sample are weighed after having been filled, by means of the second weighing unit, and finally, a third step in which, for each capsule of said sample of capsules, the difference between the associated weight, respectively, given by said first and second weighing unit is evaluated to determine the quantity of product in the capsule.

A second object of the present invention is to provide machine for performing the said method.

According to the present invention there is provided a machine for dosing a pharmaceutical product into capsules, comprising a dosing unit operable to dose a pre-determined quantity of said product into empty capsules by means of dosers, and testing apparatus operable to test the quantity of said product introduced by said dosers, said testing being performed on a sample of said capsules; characterised by the fact that said testing apparatus includes a first weighing unit in which said capsules of the said sample are weighed before dosing; a second weighing unit in which the capsules of said sample are weighed after said dosing; and finally, a third step (SIC) in which, for each capsule of said sample of capsules the difference between the weights detected respectively, by said first and second weighing unit is evaluated to determine the quantity of product in the capsule.

BRIEF DESCRIPTION OF THE DRAWINGS

The invention will now be described with reference to the attached drawings which illustrate a non-limitative embodiment thereof, in which.

DETAILED DESCRIPTION OF TEE INVENTION

Figure 1:
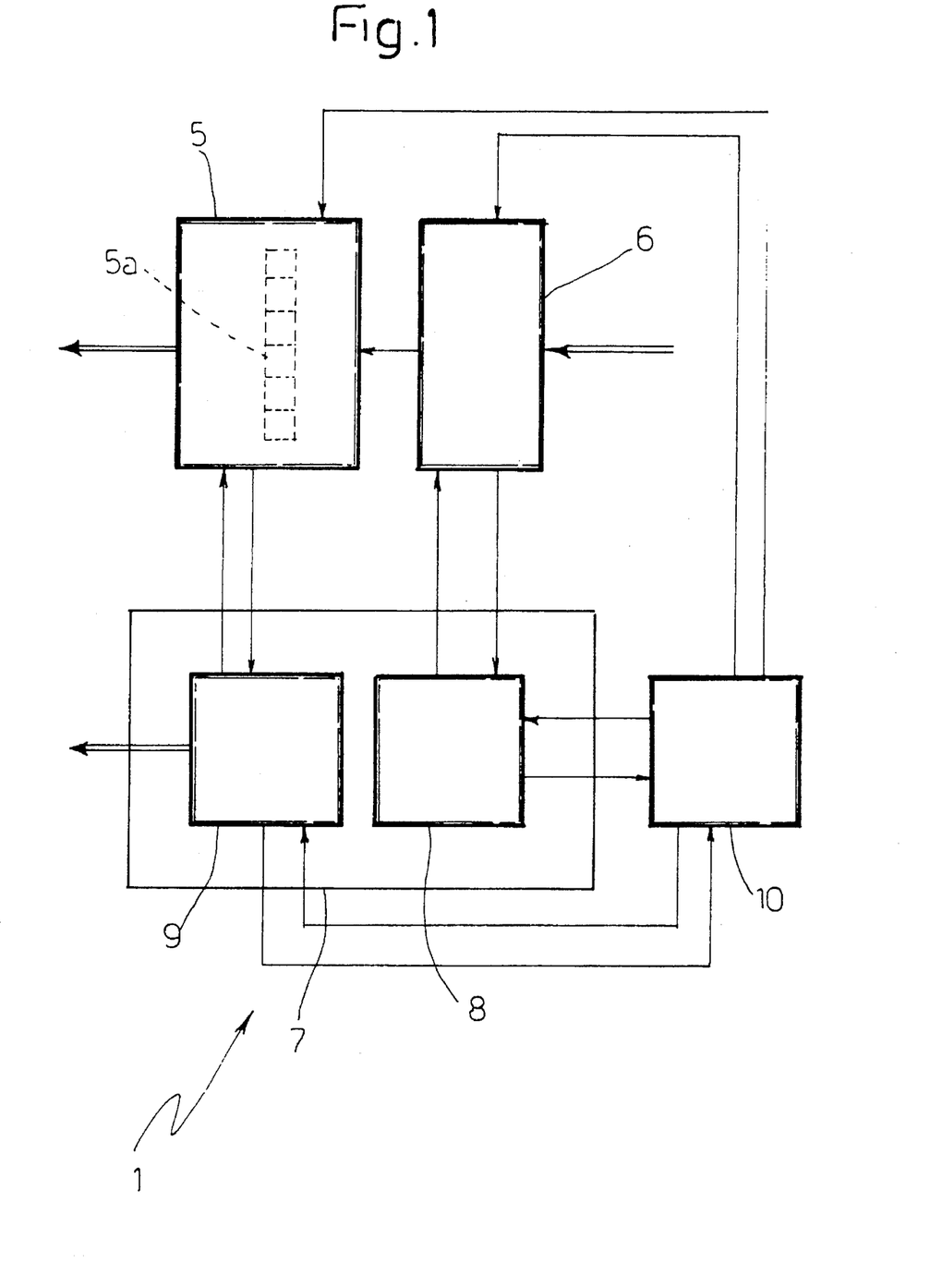
FIG. 1 is a functional block diagram of a preferred embodiment of a machine for dosing a pharmaceutical product into capsules according to the present invention.

With reference to FIG. 1, the reference numeral 1 schematically indicates a machine for metering a pharmaceutical product into capsules 2 of hard gelatin, each formed (FIGS. 3 and 4) by a base 3 and a cover 4 adapted to contain within it a pre-determined quantity of a pharmaceutical product. The machine i includes a dosing unit 5 and a feeder unit 6. The unit 6 feeds the unit 5 with empty capsules 2, and the unit 5 delivers a dosed quantity of pharmaceutical product into each empty capsule 2 to supply a packaging machine (not illustrated) with full capsules 2. The machine 1 further includes testing apparatus 7 comprising a first testing unit 8 and a second testing unit 9 which can co-operate with one another to test if a sample of capsules 2 contain quantities of dosed product lying within a range of acceptability. Finally, the machine 1 includes an electronic central control and processing unit 10 operable to manage the units 5, 6, 8 and 9. Hereinafter pneumatic means for suction and blowing will be described; these means only schematically illustrated since they are of known types.

Figure 2:
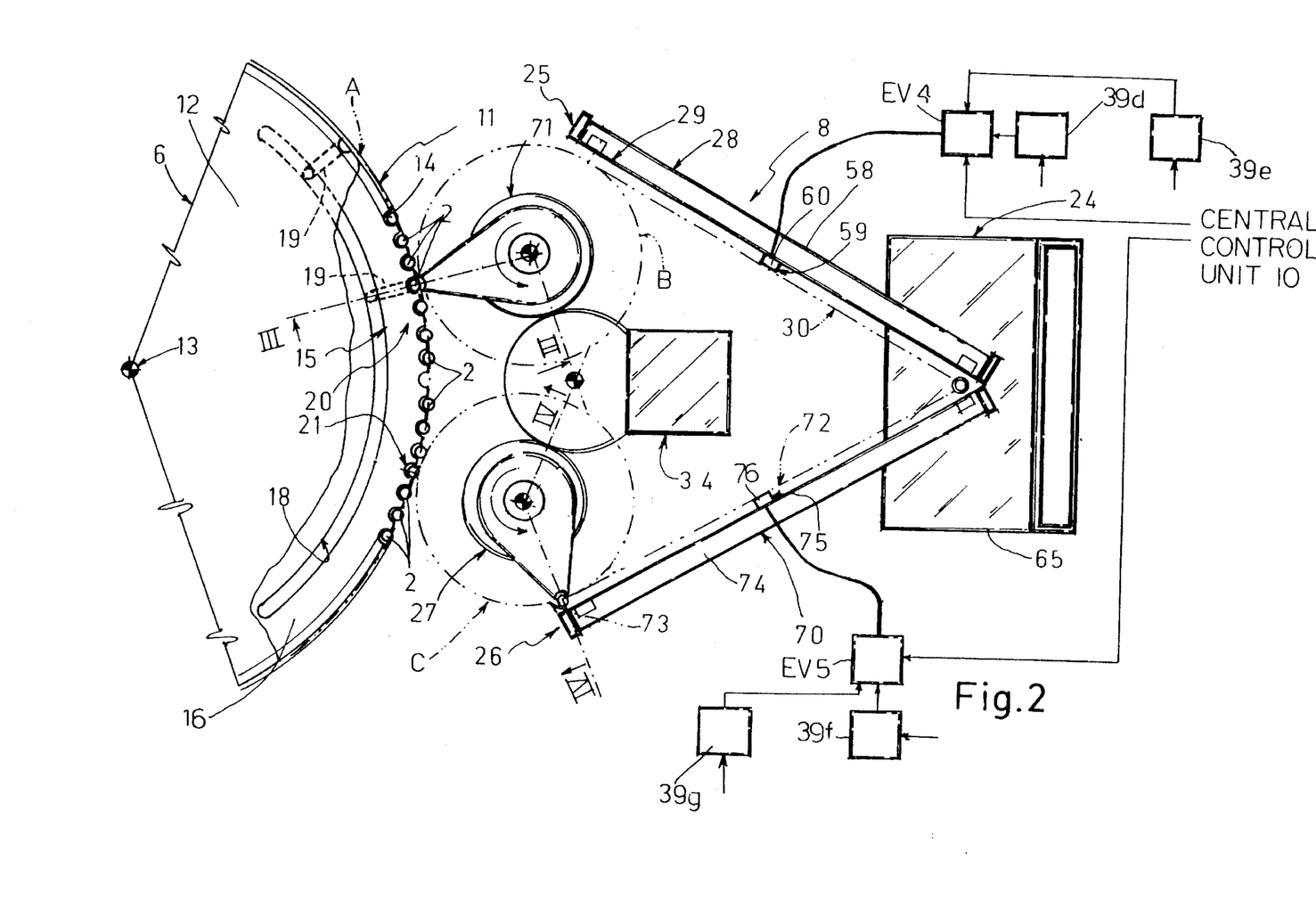
FIG. 2 is a plan view of a detail of FIG. 1.

With reference to FIG. 2, the unit 6 is operable to orientate and order empty capsules 2 disposed loose in a feed hopper (not illustrated), to form an ordered row 11 of capsules 2 to be conveyed towards the unit 5. The unit 6 includes a drum 12, rotating in a clockwise sense about a vertical access 13, provided along its entire lateral surface with cylindrical cavities 14 spaced with a constant pitch and disposed with their axes parallel to the axis 13. Each cavity 14 receives a capsule 2 of the row 11 along an arc A travelled by the capsules 2 in a clockwise sense from a first end to a second end thereof. In particular, at the first end the capsules 2 are released into the cavities 14 by a member (not illustrated and of known type) rotating together with the drum 12, and at the second end the capsules are removed by the same said member to be conveyed towards the unit 5. To retain each capsule 2 of the row 11 in the associated cavity 14 along the arc A, the unit 6 has a pneumatic holder device 15.

Figure 3:
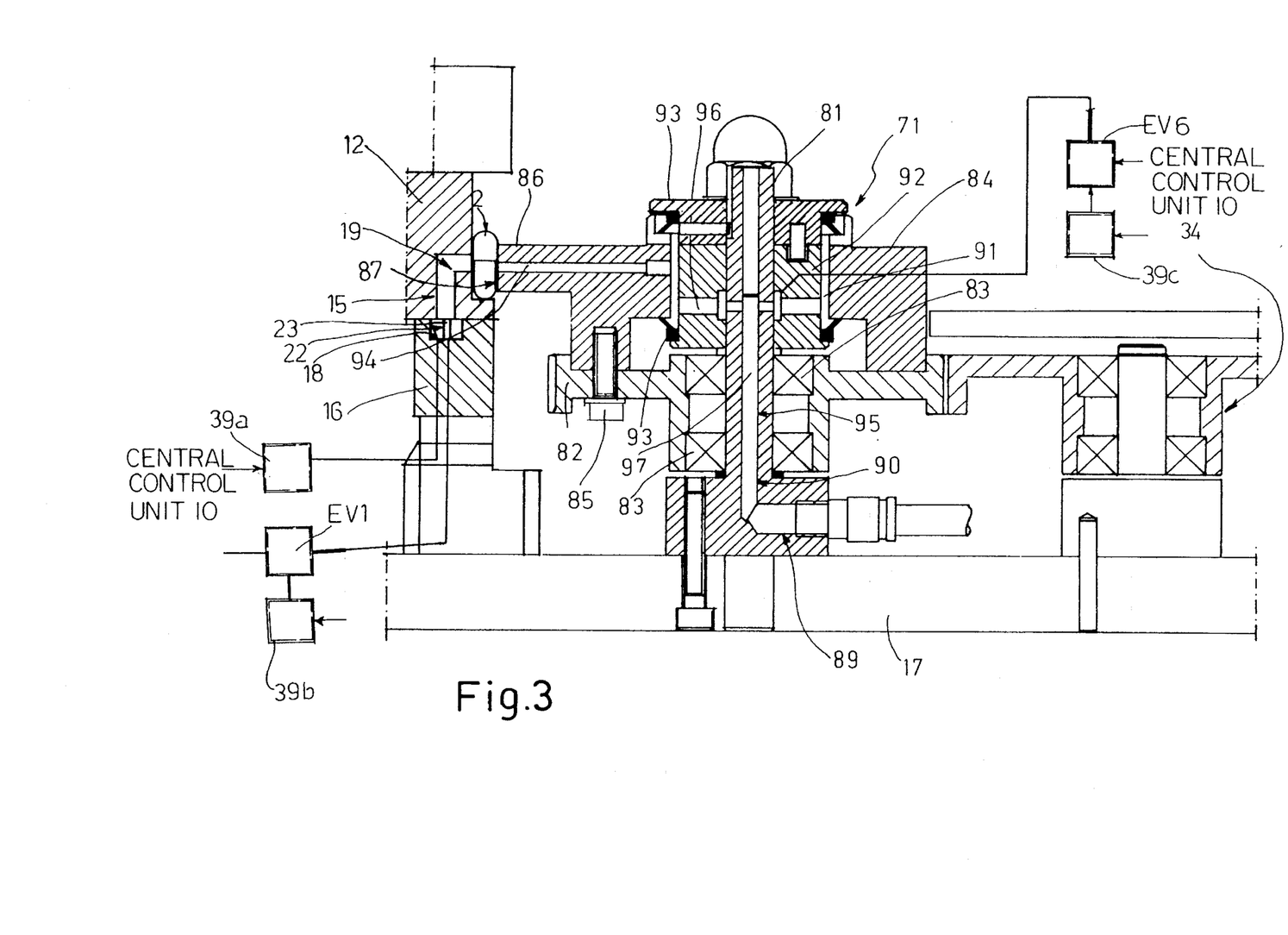
FIG. 3 is a section, on an enlarged scale, taken on the line III—III of FIG. 2.

With reference to FIG. 3, the device 15 comprises a plate 16 mounted fixedly on a support bed 17 and disposed with a lower face in contact with the drum 12. On this face the plate 16 has a groove 18, closed by the drum 12 and extending along a circular arc concentric with the arc A and of the same angular extent. The device 15 further includes a plurality of channels 19, each of which extends within the drum 12 between a corresponding cavity 14 and the groove 18. In use, a depression is maintained constantly in the groove 18 by suction means 39*a* so as to maintain a depression in the channels 19 and, consequently, to retain the capsules 2 in the associated cavities 14.

With reference to FIG. 2, along the arc A the unit 6 has a loading station 20 at which, in use, some of the capsules 2 of the row 11 are selectively transferred from the unit 6 to unit 8 and define the sample of capsules 2. The unit 6 also has a discharge station 21 at which the capsules 2 of the sample of capsules 2 transferred from the unit 8 to the unit 6. In particular, the station 21 is disposed along the arc A downstream of the station 20 in the direction of rotation of the drum 12 and spaced from the station 20 by a whole number of steps. To release a capsule 2 from the associated cavity 14 the unit 6 includes a release device 22 (FIG. 3) operable to cancel the vacuum in the channel 19 in the cavity 14 at the station 20. The device 22 includes a small tube 23 connected to blower means 39*b* via a solenoid valve EV1 controlled by the central control unit 10. The small tube 23 has a free end disposed within the groove 18 at the station 20. The free end of the small tube 23 faces the drum 12 so that for each cavity 14 in transit at the station 20 the associated channel 19 is in communication with the small tube 23 itself. Upon passage past the station 20 of the capsule 2 to be transferred to the unit 8 the device 22 blows air into the associated channel 19 to nullify the vacuum by which the capsule is retained in the associated cavity 14.

With reference to FIG. 2, the first weighing unit 8 comprises a measurement station 24 at which the capsules 2 are weighed; a first transfer device 25 operable to convey the capsules 2 from the station 20 to the station 24; and a second transfer device 26 operable to convey the capsules 2 from the station 24 to the station 21. The device 25 includes a pick-off member 71 and a first conveyor member 28 disposed sequentially between the station 20 and the station 24. The member 71 is operable to take the capsules 2 from the row 11 to feed the member 28 of a first intermediate station 29 with these capsules 2. The member 28 is operable to transfer the capsules 2 from the station 29 to the station 24 along a rectilinear path 30.

With reference to FIG. 3, the member 71 includes a shaft 81 mounted parallel to the axis 13 on the support bed 17, and a toothed wheel 82 rotatably mounted on the shaft 81 by means of a pair of ball bearings 83 and operable to receive drive from a drive device 34 (FIG. 2) of known type controlled by the central control unit 10. The member 71 further includes an annular body 84 which is mounted coaxially of and fixed to the wheel 82 by screws 85 only one of which is illustrated in FIG. 3. The body 84 has an arm 86 extending radially outwardly from the body 84 and having at its free end a cylindrical holding cavity 87 disposed with its axis parallel to the shaft 81 and able to receive a capsule 2.

With reference to FIG. 2, under the action of the device 34, the arm 86 can turn in an anti-clockwise sense, and its free end describes a circle B which is tangential to the arc A at the station 20, and to the rectilinear path 30 at the station 29. The drum 12 and the arm 86 turn in opposite senses with respect to one another and in phase with one another in such a way that the cavity 87 and a cavity 14 simultaneously transit past the station 20. At each passage of the cavity 87 past the station 20 the cavity 87 and a cavity 14 reach a position facing one another to allow, in use, the capsule 2 carried by the cavity 14 to be taken off by the member 71 to be transferred to the station 29. To take off and retain the capsule 2 in the cavity 87 during rotation from the station 20 to the station 29 the member 71 is provided with a pneumatic holder system 89. The system 89 comprises a suction circuit 90, which in turn comprises an annular chamber 91 defined by the internal periphery of the body 84 and the external periphery of a cylindrical body 92, fixedly mounted on the shaft 81 and disposed coaxially within the body 84. The chamber 91 is, moreover, closed at its axial end by a pair of annular seals 93. The chamber 91 is in communication with the cavity 87 via a duct 94 extending longitudinally within the arm 86. The circuit 90 further includes a channel 95 which can connect the chamber 91 to suction means 39*c* via a solenoid valve EV6 controlled by the central control unit 10. The channel 95 extends from the chamber 91 for a first section 96 radially through the body 92 as far as the shaft 81 and for a second section 97 axially within the shaft 81 itself. Under the action of means 39*c* the chamber 91 is able to maintain a depression in the duct 94 in any position of the arm 86 between the station 20 and the station 29. The member 28 includes a pneumatic linear actuator 58, of known type, and a holding system 59 for the capsules 2.

Figures 5, 6:
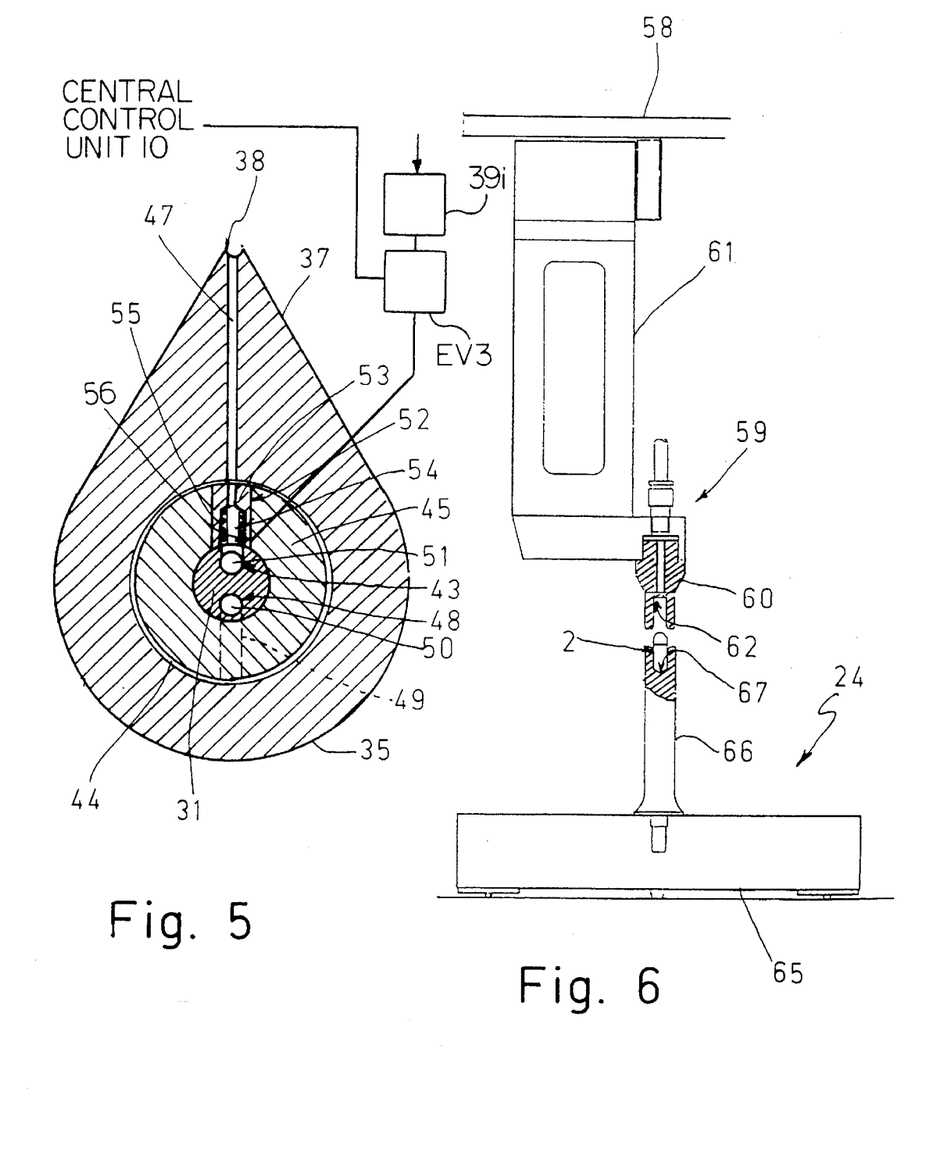
FIG. 5 is a section taken on the line V—V of FIG. 4.
FIG. 6 is a side view of a detail of FIG. 2.

With reference to FIG. 6, the system 59 includes a holder body 60 fixedly mounted at the free end of a movable arm 61 of the actuator 58 and provided with a cylindrical seat 62 which can receive a capsule 2. The system 59 further includes suction means 39*d* and a channel which can connect the means 39*d* with the bottom of the seat 62 through a solenoid valve EV4 controlled by the central control unit 10. The system 59 is, in use, activated when the body 60 is disposed at the station 29 to suck a capsule 2 from the cavity 38 in the seat 62. The system 59 holds the capsules 2 in the seat 62 along the path 30 to the station 24. Station 24 includes a weighing balance 65 of known type which is provided with a vertical rod 66 having at its free end a cylindrical seat 67 for receiving a capsule 2 released from the body 60. In particular, when the body 60 reaches the station 24, the seat 62 is facing and above the seat 67 and the solenoid valve EV4 is controlled by disconnecting it from means 39*d* and connecting it with blower means 39*e* in such a way as to stop the suction and create a low pressure inflation to allow the capsule 2 to pass from the seat 62 to the seat 67. After having weighed the capsule 2 the weighing balance 65 sends the associated data to the central control unit 10 and the capsule 2 is withdrawn by the device 26. The device 26 includes a second conveyer member 70 and an introduction member 27 disposed sequentially from the station 24 to the station 21. In detail, the member 70 can remove and convey capsules 2 along a rectilinear path 72 from the station 24 to a second intermediate station 73. The member 27 is operable to remove and convey capsules 2 from the station 73 to the station 21 at which the capsules 2 are reintroduced into the row 11.

Like the member 28, and with reference to FIG. 2, the member 70 includes a linear pneumatic actuator 74 of known type and a holder system 75 for capsules 2. The system 75 includes a holder body 76 similar to the body 60. The body 76 is fixedly mounted at the free end of the movable arm (not illustrated because it is similar to the movable arm 61 already described) of the actuator 74 and is provided with a cylindrical seat (like the seat 62) in which a capsule 2 can be received. The system 75 further includes suction means 39f and a channel for connecting the means 39f with the bottom of the said seat via a solenoid valve EV5 controlled by the central control unit 10. The system 75 is, in use, activated when the holder body 76 is at the station 24 to suck a capsule 2 upwardly from the seat 67 of the weighing balance 65. The system 75 maintains the capsules 2 in the said seat along the path 72 to the station 73, at which the solenoid valve EV5 is controlled to disconnect itself from means 39f and to connect itself to blower means 39g so as to stop the suction and create a low pressure blowing to allow the capsule 2 to be transferred from the member 70 to the member 27.

Figure 4:
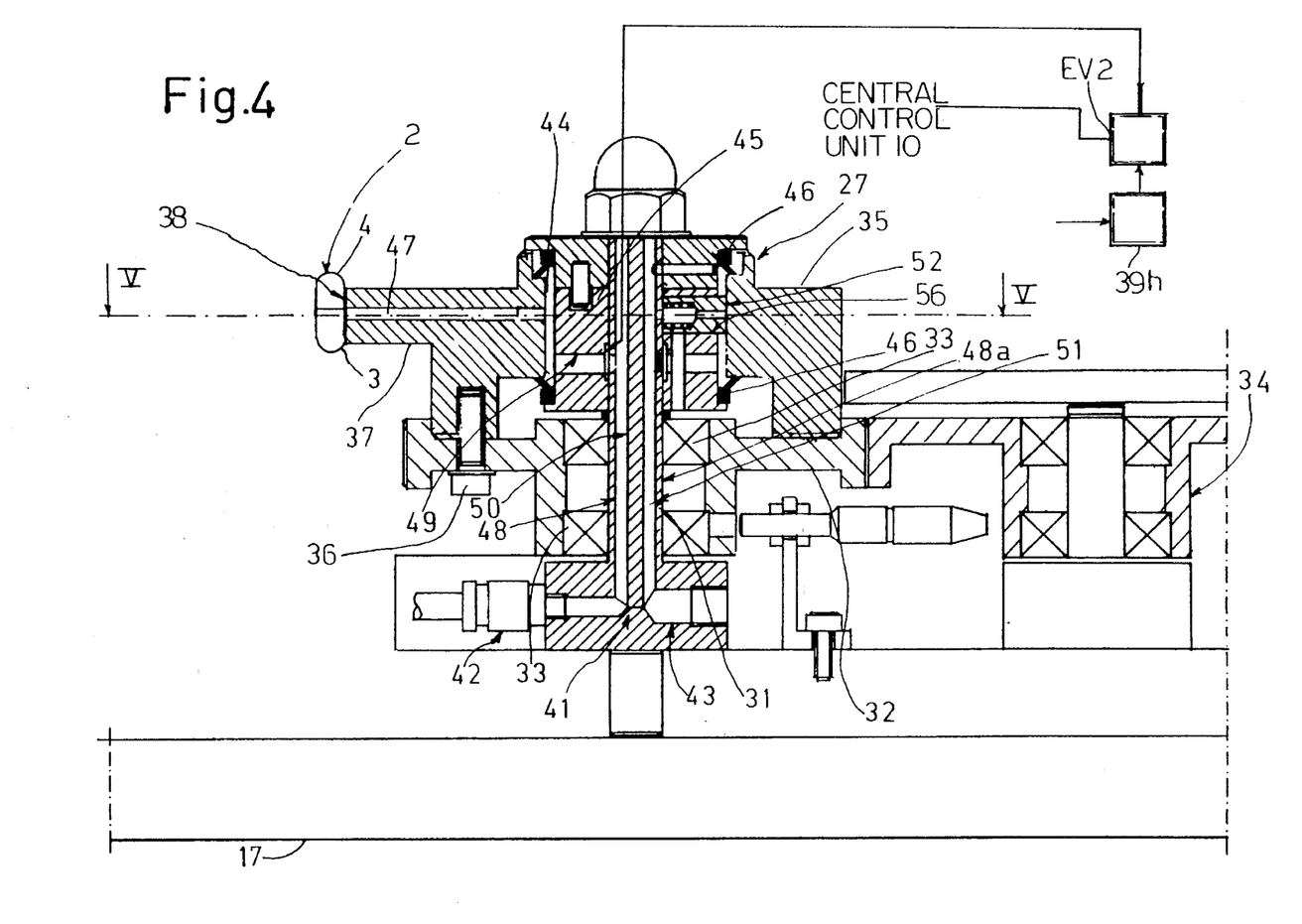
FIG. 4 is a section, on an enlarged scale, taken on the line IV—IV of FIG. 2.

With reference to FIG. 4 the member 27, like the member 71, includes a shaft 31 mounted parallel to the axis 13 on the support bed 17 and a toothed wheel 32 mounted rotatably on the shaft 31 by a pair of ball bearings 33 and can be driven by the device 34. The member 27, further includes an annular body 35 which is mounted coaxially and fixedly on the wheel 32 by screws 36 only one of which is illustrated in FIG. 4. The body 35 has an arm 37 extending radially outwardly from the body 35 and having at its free end a cylindrical holding cavity 38 disposed with its axis parallel to the shaft 31 so as to be able to receive a capsule 2.

With reference to FIG. 2, under the action of the device 34, the arm 37 can turn in an anti-clockwise sense and its free end can describe a circle C tangential to the rectilinear path 72 at the intermediate station 73 and to the arc A at station 21. To remove a capsule 2 and retain it in the cavity 38 during rotation from the intermediate station 73 to the discharge station 21, the member 27 is provided with a holding and release system 41 of pneumatic type illustrated in FIGS. 4 and 5. The system 41 comprises a suction circuit 42 and a blowing circuit 43. Circuit 42 includes an annular chamber 44 defined by the inner periphery of the body 35 and the outer periphery of a cylindrical body 45 fixedly mounted over the shaft 31 and disposed coaxially within the body 35. The chamber 44 is, moreover, closed at its axial ends by a pair of annular seals 46. Chamber 44 is connected to the cavity 38 by a duct 47 extending longitudinally within the arm 37. The circuit 42 further includes a channel 48 which can connect the chamber 44 to suction means 39h via a solenoid valve EV2. The channel 48 extends from the chamber 44 for a first section 49 radially through the body 45 to the interior of the shaft 31 and axially through the shaft 31 for a second section 50. The chamber 44 can maintain a depression in the duct 47 in any angular position of the arm 37 between the station 73 and of the station 21. Upon passage of the cavity 38 through the station 73 the system 75 of the member 70 is disactivated to allow a capsule 2 housed in the body 76 to be removed by the member 27 via its holding system 41.

The circuit 43 is operable to create a slight pressure in the duct 47 upon passage of the cavity 38 past the station 21 to nullify, substantially instantaneously, the depression in the duct 47 which retains the capsule 2 in the cavity 38. The circuit 43 includes a channel 51 extending within the shaft 31 to connect a radial passage 56 (FIG. 5) formed in the body 45 to the blower means 39i via a solenoid valve EV3. The circuit 43 further includes a diverter element 52 disposed within the passage 56 and able to connect the channel 51 to the duct 47 upon passage of the cavity 38 past the station 21. It is to be noted that the section shown in FIG. 5 is not an exact representation of the section defined line V—V of FIG. 4, but a similar section in which, the slot 56 of the body 45 is shown in alignment with the duct 47. It is thus possible to show the operation of the member 27 with greater clarity.

The element 52 includes a tubular body 53 traversed longitudinally by a duct 54, and a spring 55 mounted under compression between the body 53 and the shaft 31 to press the body 53 against the body 35. When, in use, the cavity 38 transits the station 21 the duct 47 is disposed coaxially of the duct 54 and in communication with the said blower means 39i which are actuated to blow air into the duct 47. The drum 12 and the arm 37 rotate in opposite senses with respect to one another and in phase with one another in such a way that the cavity 38 and a cavity 14 simultaneously transit the station 21. At each passage of the cavity 38 through the station 21, the cavity 38 and a cavity 14 are located facing one another to allow a capsule 2 carried by the cavity 38 to be removed from the unit 6 and reintroduced into the row 11 following disactivation of the circuit 42 and activation of the circuit 43. Once reintroduced into the row 11 the capsules 2 are conveyed towards the unit 5 which is operable, successively, to separate the covers 4 from the bases 3 to open the empty capsules 2, and to meter or dose a pre-determined quantity of products into the bases 3 by means of a plurality of dosers 5a schematically illustrated in FIG. 1 since they are of known type, and then to reclose the bases 3 with the associated covers 4. The thus-filled capsules 2 are conveyed towards the said packaging machine by a conveyer device (not illustrated) with which the unit 5 is provided. Under the control of the central control unit 10 the conveyer device can, moreover, selectively divert capsules 2, previously weighed at the unit 8, towards the unit 9. The unit 9, of known type, is operable to weigh each capsule 2 of the said sample of capsules 2 and to send the associated data to the central control unit 10. The central control unit 10, also of known type, is operable to co-ordinate the units 5, 6, 8 and 9 with one another and to process data received from the units 8 and 9 in a manner which will be described hereinbelow.

In use the unit 5 is supplied with capsules 2 from the row 11 to meter or dose a pre-determined quantity of pharmaceutical product into each capsule 2 by a plurality of dosers 5a, and in turn supplies, via the conveyer device (not illustrated) a packaging machine (not illustrated) with full capsules 2. At each passage of the cavity 87 past the loading station 20 the release device 22 of the unit 6 and the suction circuit 90 of the member 71 are activated to allow the member 71 to withdraw a capsule 2 from the drum 12. Following subsequent rotation of the arm 86 in an anti-clockwise sense the capsule 2 arrives at the station 29 in which the capsule 2 is released by the member 71 to the member 28 after the circuit 90 has been disactivated and the holding system 59 activated. Under the thrust of the actuator 58 the capsule 2 is transferred into the station 24, which acts to weigh the capsule 2. After weighing has been completed the station 24 sends the associated data to the central control unit 10 and the capsule 2 is taken off by the member 70. Under the thrust of the actuator 74 the capsule 2 is transported from the station 24 to the station 73. At station 73 the capsule 2 is taken off by the member 27 by actuation of the circuit 42, and transferred to station 21 after anti-clockwise rotation. At station 21 the capsule 2 is taken off by unit 6 to be conveyed to unit 5. The members 71 and 27 rotate in phase with respect to one another in such a way that a capsule 2 is taken off by the member 71 at station 20 and simultaneously a capsule 2 is taken off by the member 27 at station 73, whilst simultaneously a capsule 2 is released up by the member 71 at station 29 and a capsule 2 is released by the member 27 at station 21. In particular, at station 21 the capsule 2 is housed within a cavity 14 of the drum 12 which has no associated capsule 2 because it has been taken by the member 71 upon passage through the station 20. At the unit 5 the capsule 2 is opened by separating the cover 4 from the base 3, a pre-determined quantity of the product is dosed into the base 3 by a doser 5a, and finally the base 3 is closed by the associated cover 4. Following this the capsule 2 is diverted towards the unit 9 via the said conveyer device.

The unit 9 provides for weighing the capsule 2 and sends the associated data to the central control unit 10 for processing. In the first place the central control unit 10 evaluates the weight of the quantity of dosed product within each capsule 2 of the sample. This value is obtained as the difference between the data coming from the unit 9 and the data coming from the unit 8. Subsequently, the weight of the quantity of product is compared with a pair of values delimiting the said range of acceptability of the capsule 2. If the weight of the quantity of product is outside the said range, the central processing unit 10 activates the unit 9 to reject the capsule 2. If the weight is within the range the central unit 10 activates the unit 9 to convey the capsule 2 towards the packaging machine (not illustrated).

Secondly, the central control unit 10 statistically processes the weights of the quantities of product dosed into the capsules 2 in order to monitor over time the efficiency of the dosers 5a of the unit 5. The weights obtained by the data coming from the units 8 and 9 are re-grouped into sets of values, each of which comprises the weights of capsules 2 into which the product has been dosed by the same doser 5a. In order to weigh capsules 2 intended, in succession, for different dosers 5a the angular velocity of the drum 12 and of the takeoff member 71 are chosen in such a way that the member 71 successively takes capsules 2 from the row 11 which are each intended for a different doser 5a in the same succession. The central control unit 10 is also able to stop the machine 1 when one or more of the dosers 5a repeatedly delivers product in quantities outside the pre-determined range.

From what has been described above the advantages achieved by the embodiment of the present invention will be apparent.

In particular, the quantity of product dosed into capsules 2 is determined with high precision in that it is evaluated as a difference between the weight of the full capsule and the weight of the empty capsule which is measured with precision by the first weighing unit. Moreover, the statistical processing of the weights of dosed product in the said sets of values makes it possible to monitor the operation of the dosers and the uniformity of the product over time. If, for a specific set of values, the quantity of dosed product is outside the said range, it is evident that a doser has lost its efficiency and it is possible to stop the machine to operate directly on that doser device. If, all the sets the quantities of product are outside the range of acceptability it is evident that the pharmaceutical product supplied to the dosing unit does not have the required density characteristics.

Finally, it is clear that modifications and variations can be introduced to the method and the machine described above, without departing from the protective ambit of the present invention.

In particular, in a variant not illustrated, the dosing unit is provided with an automatic dosing adjustment device. The device is connected to the central control and processing unit in order selectively and automatically to operate on those metering devices 5a which have lost their efficiency.

What is claimed is:

1. A machine for dosing a pharmaceutical product into capsules, comprising; a dosing unit operable to dose a pre-determined quantity of said product into empty capsules by means of dosers and a test apparatus operable to test the quantity of said product dosed by said dosers, said testing being performed on a sample of said capsules, characterised in that said testing apparatus includes a first weighing unit in which said capsules of said sample are weighed before said dosing, a second weighing unit in which the capsules of said sample are weighed after said dosing, and processing and monitoring means operable, for each capsule of said sample, to evaluate the difference between the weight detected, respectively, by said first and second weighing units to determine the quantity of dosed product; said machine further including a feed unit operable to form an ordered succession of said empty capsules and to convey said empty capsules towards said dosers; said feed unit including a loading station at which said empty capsule is transferred to said first weighing unit, and a discharge station at which said empty capsule is received from said first weighing unit; said feed unit including a rotating drum having cylindrical cavities provided around the whole of the lateral surface of said rotating drum, spaced with constant pitch and able to receive said capsules of said succession along an arc of the circumference; said loading and discharge stations being disposed along said arc.

2. A machine according to claim 1, characterised in that said feed unit includes holder means for holding said capsules of the succession in associated cylindrical cavities along said arc, said feeding unit further including release means for releasing a capsule to said first weighing unit when said capsule is in said loading station.

3. A machine according to claim 1, characterised in that said first weighing unit includes a first transfer device, a second transfer device, and a measuring station including a weighing balance; the first device being operable to transfer each capsule of said sample from said loading station towards said measuring station where said capsule is weighed, and said second device being operable to transfer said capsule from said measuring station towards said discharge station for reintroducing said capsule into said succession of capsules.

4. A machine according to claim 3, characterised in that said first transfer device includes a take-off member operable to take one said capsule from said succession of capsules at said loading station, and a first conveyor member supplied with said capsule at a first intermediate station to move said capsule from said intermediate station to said measurement station.

5. A machine according to claim 4, characterised in that said take-off member includes a first driven arm rotatable about a support shaft in an opposite sense with respect to said drum, said first driven arm having at the free end of said first driven arm a first holding cavity for housing a capsule, the free end of said first driven arm describing a first circle tangential to said arc at said loading station, in which said first holding cavity and one of the cylindrical cavities face one another to allow a capsule carried by said cylindrical cavity to be taken off by said take-off member and transferred to said first intermediate station.

6. A machine according to claim 5, characterised in that said take-off member further includes holding means operable to grip a capsule when said first holding cavity passes said loading station, to retain said capsule in passing from said loading station to said intermediate station, and finally to release said capsule at said intermediate station.

7. A machine according to claim 4, characterised in that said first conveyor member comprises a first linear actuator and a first holding system for capsules, said first holding system including a first holding body fixedly mounted at the free end of a first movable arm of said first actuator and provided with a cylindrical seat for housing a capsule.

8. A machine according to claim 4, characterised in that said second transfer device includes a second conveyor member and an introduction member, said second conveyor member being operable to move one of said capsules from said measurement station to a second intermediate station to supply said introduction member which is operable to introduce said capsule into said succession at said discharge station.

9. A machine according to claim 8, characterised in that said second conveyor member includes a second linear actuator and a second holding system for the capsules, and wherein said second holding system includes a second holding body fixedly mounted at the free end of a second movable arm of said second actuator and provided with a cylindrical seat for receiving a capsule.

10. A machine according to claim 8, characterised in that said introduction member includes a second driven arm rotatable about a support shaft in an opposite sense from said drum, said second arm having at its free end a second holding cavity for receiving a capsule, the free end of said second arm describing a second circle tangential to said arc at said discharge station, in which said second cavity and one of the cylindrical cavities are facing one another to allow a capsule carried by said second holding cavity to be taken off by said drum.

11. A machine according to claim 10, characterised in that said introduction member further includes holding and release means operable to grip a capsule when said second holding cavity passes the second intermediate station to retain and carry said capsule from said second intermediate station to said discharge station, and finally to release said capsule at said discharge station.

12. A machine for testing the amount of a pharmaceutical product being dosed into capsules by a dosing unit, comprising:
 a first weighing unit for weighing a selected capsule before the selected capsule is dosed by the dosing unit;
 a second weighing unit for weighing the selected capsule after the selected capsule is dosed by the dosing unit;
 processing means to evaluate the difference between the weights measured by the first and second weighing units to determine the amount of dosed product in the selected capsule; and
 a feed unit for forming an ordered succession of empty capsules to convey the empty capsules towards the dosing unit, the feed unit including
  a rotating drum having cylindrical cavities on the lateral surface of the rotating drum, the cylindrical cavities being spaced apart from each other and adapted to receive the empty capsules;
  a loading station at which the selected capsule is transferred from the rotating drum to the first weighing unit; and
  a discharge station at which the selected capsule is transferred from the first weighing unit into the rotating drum after the selected capsule is weighed by the first weighing unit.

13. The machine according to claim 12 wherein the feed unit further comprises:
 holder means for holding the empty capsules in the cylindrical cavities; and release means for releasing the selected capsule of the empty capsules to the first weighing unit when the selected capsule is positioned at the loading station.

14. The machine according to claim 12 wherein the first weighing unit comprises:
 a measuring station including a weighing balance;
 a first transfer device for transferring the selected capsule from the loading station towards the measuring station wherein the selected capsule is weighed by the weighing balance; and
 a second transfer device for transferring the selected capsule from the measuring station towards the discharge station for reintroducing the selected capsule into the succession of the empty capsules.

15. The machine according to claim 14 wherein the first transfer device comprises:
 a take-off member positioned to receive the selected capsule at the loading station; and
 a conveyor member positioned to receive the selected capsule from the take-off member, the conveyor member for moving the received selected capsule to the measurement station.

16. The machine according to claim 15 wherein the take-off member comprises:
 a driven arm having a free end and being rotatable about a support shaft; and
 a holding cavity positioned at the free end for receiving the selected capsule, the free end describing a circle tangential to the lateral surface of the rotating drum at the loading station, wherein the holding cavity and the cylindrical cavity holding the selected capsule face each other to allow the selected capsule to be transferred from the cylindrical cavity to the holding cavity.

17. The machine according to claim 16 wherein the take-off member further comprises holding means for retaining the selected capsule when the holding cavity passes the loading station and receives the selected capsule.

18. The machine according to claim 15 wherein the conveyor member comprises:
 a linear actuator including a moveable arm slidably mounted therein; and
 a holding body mounted at the free end of the movable arm, wherein the selected capsule is received in the holding body from the take-off member, and the linear actuator moves the holding body containing the selected capsule towards the measuring station.

* * * * *